Feb. 14, 1956  W. H. WILLERT  2,734,226
INJECTION MOLDING APPARATUS
Filed March 5, 1952  3 Sheets-Sheet 1
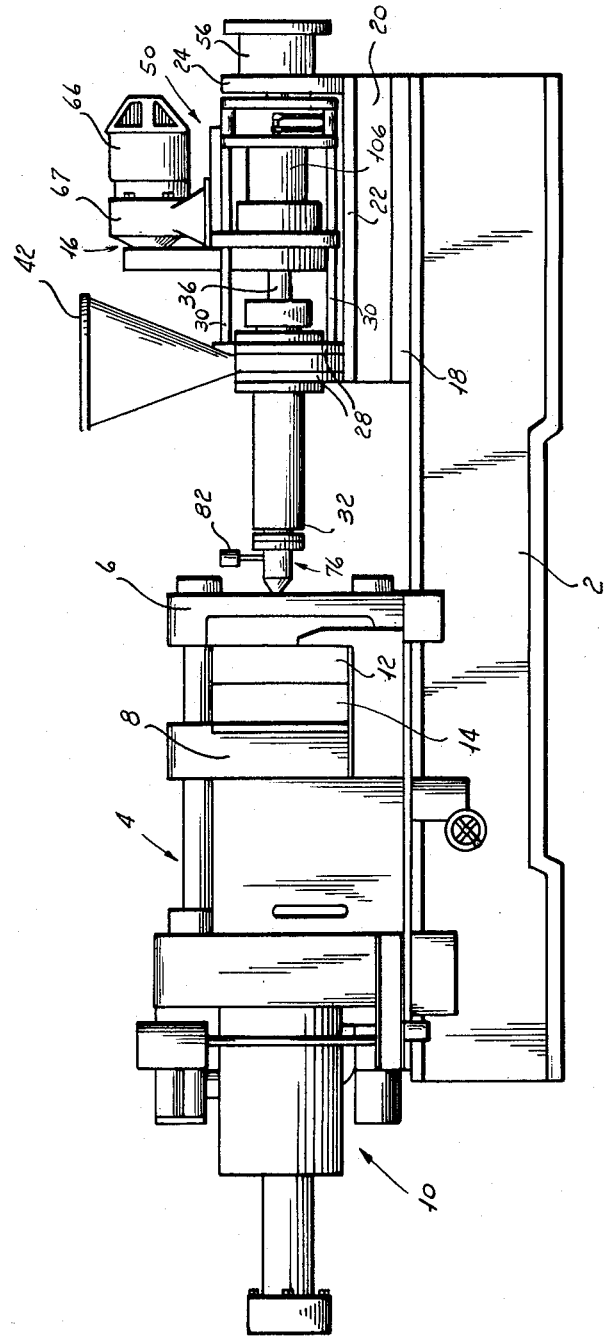
INVENTOR
WILLIAM H. WILLERT
BY
ATTORNEY

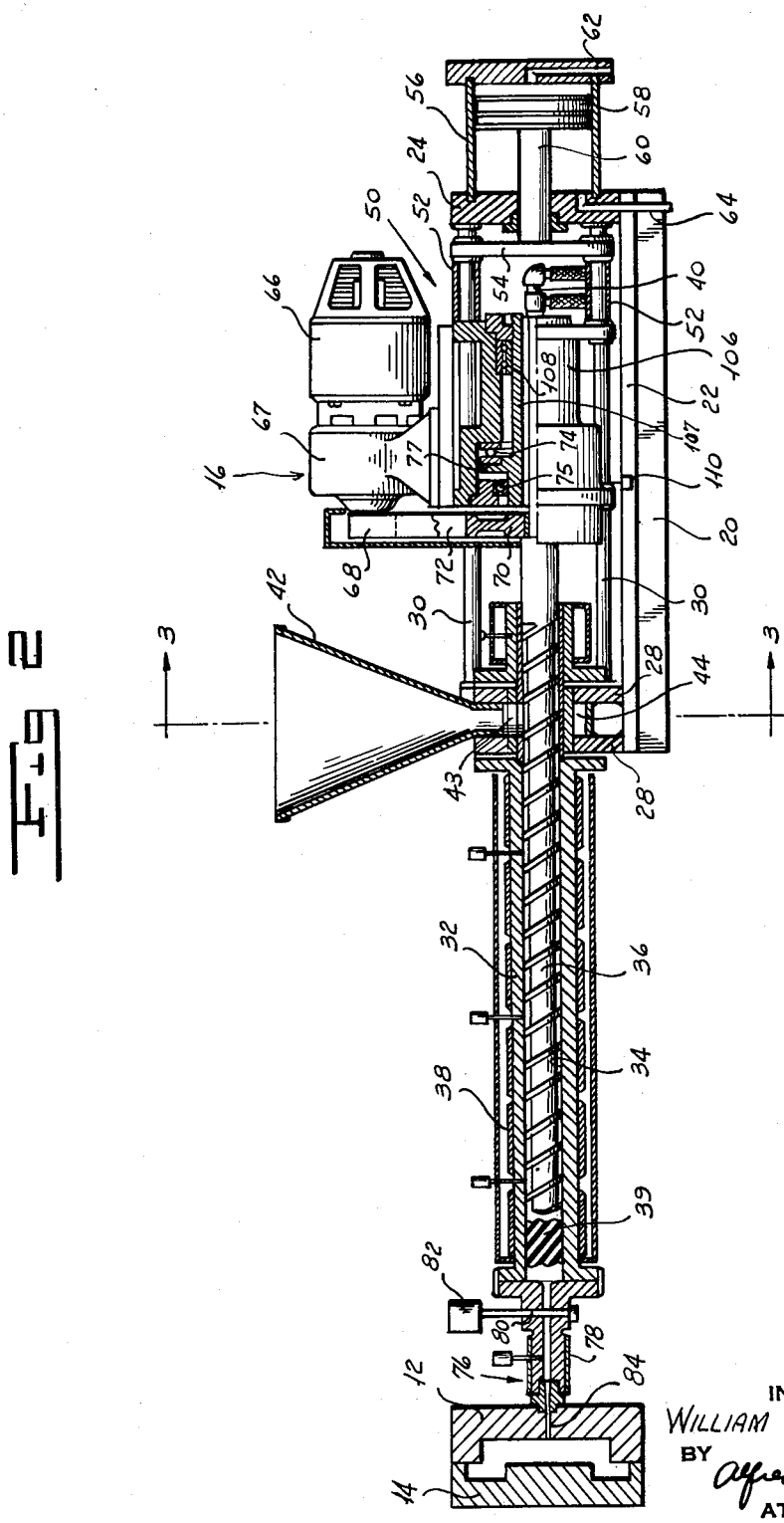

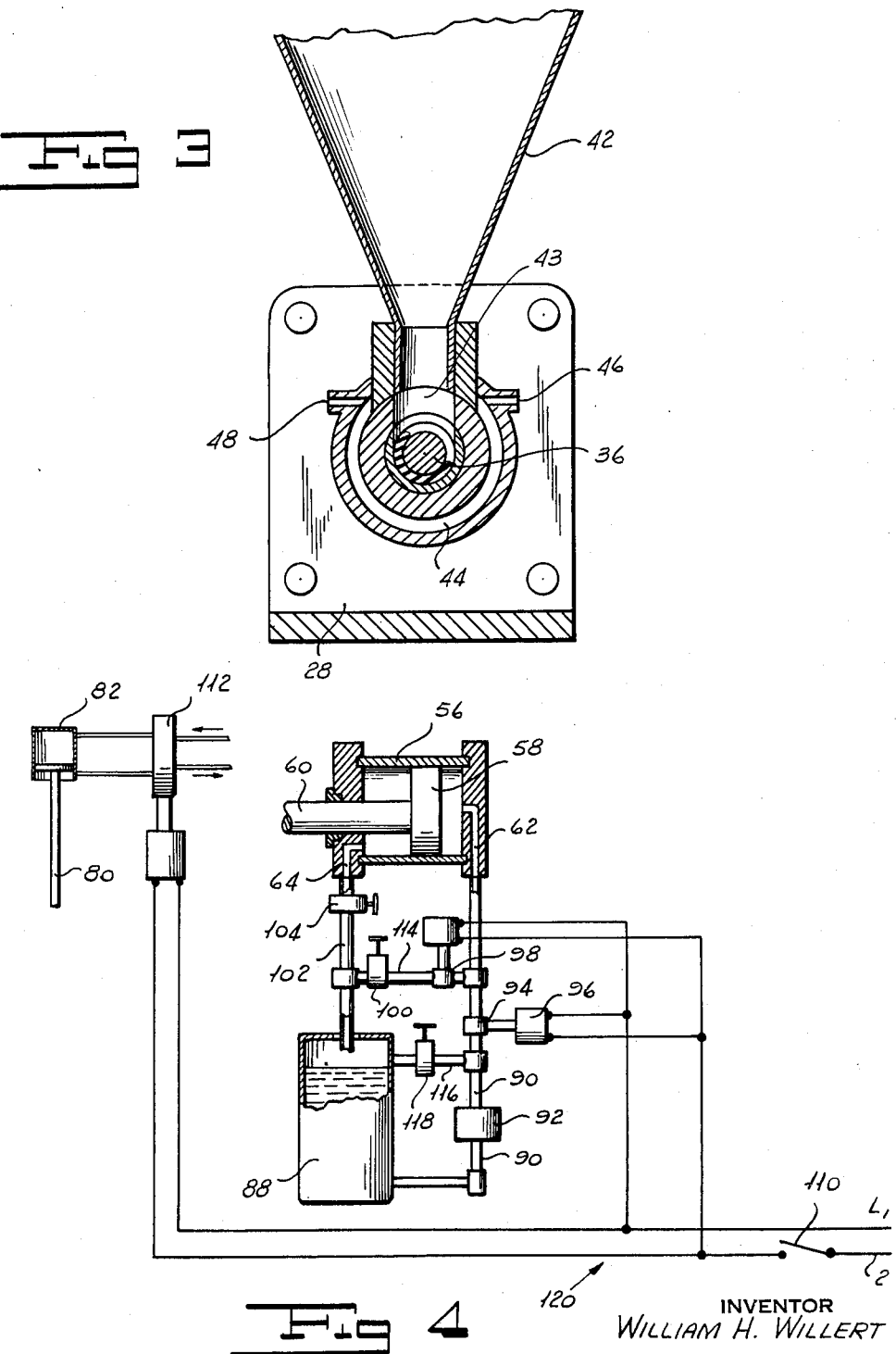

United States Patent Office 2,734,226
Patented Feb. 14, 1956

2,734,226

INJECTION MOLDING APPARATUS

William H. Willert, Clifton, N. J.

Application March 5, 1952, Serial No. 274,897

10 Claims. (Cl. 18—30)

This invention relates to novel apparatus for treating plastic materials. More particularly, the invention relates to a mechanism for plasticizing and delivering softened plastic material. In its broadest aspects, such mechanism can be employed without a mold, for example as a supply for plastic material in plastic blow molding operations. In the preferred embodiment of the apparatus shown, however, it is illustrated employed as an element of an injection molding machine, the mechanism of the invention delivering plasticized material under high pressure into the mold in timed relation with the operations of closing the mold, presenting the material delivering apparatus to the mold, and opening the mold to permit removal of the molded article.

The trend in the plastics molding art has been steadily in the direction of the production of larger and larger integral molded parts. This has introduced new problems into the injection molding field or has aggravated the problems already present. Such technical difficulties center around the problem of designing a machine to deliver a consistent mass of thoroughly homogenized plastic material at a uniform rate and temperature under pressure to a mold. In order to achieve this condition, especially on injection molding machines of 60 ounce capacities and over, various forms of "preplasticizers" have been developed and added to the existing injection molding machines. All the various types of preplasticizer units condition the plastics, usually thermoplastics, to a desired state for molding and then discharge such plastic material into a transfer cylinder for injection into the mold cavity. In effect such preplasticizers continue to operate until molten plastic has accumulated in the transfer cylinder to produce the desired size "shot" of plastic material into the mold, following which such "shot" is injected into the mold. In spite of the use of such preplasticizers it is usually necessary, however, to start with a thoroughly compounded formula of a uniform particle size to insure elimination of air and the scoring of the plunger of the injection molding machine, and to obtain the desired results insofar as homogeneity and uniformity of the finally molded article are concerned.

Briefly the apparatus of the present invention when employed in conjunction with a mold such as that of an injection molding machine, produces a homogeneous mass of plastic compound free of volatile matter, air, or other condensable substances, in an optimum plasticized state to be injected into such mold or into a transfer cylinder, if the latter is used. The resulting molded article is characterized by its uniformity, freedom from strain, and the faithfulness with which it follows even the finest and most intricate details of the mold cavity.

More particularly the invention has as an object thereof the provision of a novel, simple, economical, mechanism for plasticizing plastic materials and for delivering them in such state, preferably in measured quantities.

Such invention has as a further object the provision of apparatus for delivering the plastic material in mixed, optimumly plasticized condition, whereby the resulting article is uniform and homogeneous and faithfully follows the contours of the mold.

A still further object of the invention lies in the provision of mechanism of the type described in which the plastic material is thoroughly mixed and plasticized, as well as brought to a uniform desired temperature before injection into the mold, whereby lower injection and mold clamping pressures are possible than heretofore, and also whereby the plastic material is subjected to a shorter total heating cycle than was possible with previous apparatus.

Yet another object of the invention resides in the provision of apparatus of the type described wherein the plastic material is quickly and efficiently heated to the desired temperature, and wherein the plastic material is plasticized, mixed, and injected into the mold without coming into contact with free air.

A still further object of the invention resides in the provision of an injection molding apparatus which makes possible, by simple economical apparatus and without the use of the conventional transfer cylinder, the injection of large quantities of plastic material at one time, whereby large integrally molded plastic articles of homogeneous uniform structure may be produced.

The above and further objects of the invention will be more readily apparent upon consideration of the accompanying drawings, in which:

Fig. 1 is a view in side elevation of a typical injection molding apparatus incorporating a preferred embodiment of the mechanism of the invention;

Fig. 2 is a view in vertical axial section through the plasticizing and plastic material delivering unit of the apparatus of Fig. 1, the screw rotating motor and a portion of the screw reciprocating carriage being shown in side elevation, such plasticizing and plastic material delivering unit being shown schematically in operative relationship to a mold;

Fig. 3 is a view in vertical section through the plastic material feeding apparatus in a direction transverse to the section employed in Fig. 2, such section being taken through the feed hopper of the apparatus and along the line 3—3 in Fig. 2; and Fig. 4 is a diagrammatic layout of the hydraulic system governing the plastic material feeding screw reciprocating means, such hydraulic system being shown schematically in connection with a portion of the electrical circuit governing the cycling of the various parts of the injection molding machine illustrated.

The plasticizing and plastic material delivering unit of the invention is illustrated herein in its use as the material injecting mechanism of the otherwise conventional injection molding apparatus shown in Fig. 1. Such apparatus, which is of the horizontal type, is provided with a main bed 2, on which there is supported, at the left-hand end, the mold supporting and operating structure generally designated 4. Structure 4 incorporates the fixed platen 6 which extends from the bed 2 in a vertical direction, and the horizontally reciprocable platen 8, such latter platen being reciprocated toward and away from the fixed platen by the mechanism generally indicated at 10. Platens 6 and 8 have attached thereto in confronting relationship, respectively, the separable mold halves 12 and 14, mold part 12 having the sprue passage 84 therethrough and cooperating with the plasticizing and plastic material delivering unit 16 in a manner to be more fully described. The mold parts are clamped together, in one portion of the operating cycle, in confronting, cavity providing relationship, by the mechanism 10.

The unit 16 is reciprocably mounted on ways 18 on bed 2 of the machine, so as selectively to move toward and away from the fixed platen 6 and the mold part 12.

Unit 16 embodies a carriage having a bed portion 22, the way engaging guides 20 being affixed to such bed. The bed 22 of the carriage supporting unit 16 has affixed thereto at the right the vertical head forming member 24, and at the left the parallel vertical plates 28, the latter plates being spaced from each other to provide the lower terminus of the feed hopper to be described. The right-hand plate 28 is connected as shown to the head 24 by parallel tie-rods 30.

Attached to the left-hand plate 28 is the plasticizing and plastic material delivering barrel 32, such barrel having an axial circular cylindrical bore 34 therethrough. Positioned in such bore 34 there is the rotatable and reciprocable material plasticizing and forwarding screw 36, which in the embodiment shown is of the single helical land type, but which, as will be apparent, may be of various other types depending upon the kind of plastic material to be worked upon. The outer surfaces of the lands of the screw 36 lie at least substantially on an imaginary cylinder parallel to the common axis of the screw and of the bore in the barrel, the outer surfaces of the lands lying close to the surface of the bore. The barrel 32 and the plastic material contents thereof are held at the desired temperature by means of the separate wound electric resistance band heaters 38 positioned on the outer surface fo the barrel, each of such heaters being under the control of its own adjustable thermostat so that its respective zone of the barrel and its contents may be held at substantially a predetermined temperature. A jacket with suitable heat insulating material within it is preferably positioned about the barrel, as shown. Preferably the screw 36 is temperature controlled by being made hollow interiorly and by having temperature controlling fluid circulated therethrough through the fitting 40, shown at the right-hand end of the screw in Fig. 2.

The feed hopper 42, into which the plastic material is fed, is in the form of a funnel, the smaller lower end of the hopper communicating with the throat or feed section 43. Such throat is preferably lined with either cast iron or other soft metal to prevent "galling." A water jacket 44 which surrounds the throat 43 of the feed hopper is provided with an inlet 46 and a discharge outlet 48. Such water jacket prevents the plastic material from softening unduly or fusing before it reaches the feed screw 36.

The unit 16, which, as above stated, is itself reciprocable on the bed 2 of the machine, incorporates a reciprocable carriage 50, such carriage 50 carrying means whereby the screw 36 is both rotated and reciprocated, the end of the screw at the right in Fig. 2 being attached to carriage 50 so that reciprocation of such carriage impels the screw 36 longitudinally in the bore 34 of the barrel. As shown, the carriage 50 is supported by appropriate sleeve members to reciprocate on the spaced horizontal tie-rods 30. At the right-hand end of the main portion of carriage 50 there are provided the sleeves 52 about the tie-rods 30, such sleeves connecting the carriage to the cross head 54. At the right of the fixed head 24 on bed 22 of the unit 16 there is provided the hydraulic cylinder 56, such cylinder having within it the piston 58, the rod 60 of which is attached to the cross head 54. A fluid inlet 62 is provided in the outer end of cylinder 56, whereby fluid under pressure may be introduced into the right-hand end of the cylinder to thrust the carriage 50 and the screw 36 in a direction to the left in Fig. 2.

The lengths of the barrel 32, of the screw 36, of the path of reciprocation of carriage 50, and the length of the hydraulic cylinder 56 are all correlated and made such that when the carriage 50 is in its furthest position to the right, the forward or left-hand end of the feed screw 36 provides a plastic material receiving space or reservoir 39 within the bore 34 and beyond such forward end of the screw which substantially equals the volume of the plastic material which the machine will be called upon to inject in one cycle. The screw thread providing helical land or lands on the screw 36 extend sufficiently toward the right-hand end of the screw so that when the feed screw and carriage are moved to their extreme left-hand position a fully developed helically grooved portion of the screw will lie within the throat 43 beneath the feed hopper 42. Preferably at least one fully developed helical turn of the feed screw will extend to the right of such throat when the screw and carriage are advanced fully to the left, for a purpose to be described hereinafter.

Carriage 50 carries thereon, as shown, a variable speed electric motor 66 which drives a speed reducer 67, the output shaft of the speed reducer having the sprocket 68 thereon. A housing member 106 rotatably carries within it on bearings 75 and 108 the sleeve member 107 receiving within it the right-hand end of the feed screw 36. Such sleeve 107 is keyed to the feed screw so that such screw may be rotated by means of the sprocket 70 affixed to the sleeve 107, the chain 72 being entrained over such sprocket and the previously mentioned sprocket 68. The thrust exerted by the piston rod 60 upon the cross head 54 is transmitted through the structure of the carriage 50 to the thrust bearing 74 and thence to the flange 77 provided on the sleeve 107.

To the left-hand end of the barrel 32 there is affixed the nozzle providing element 76, such element having an axial bore therethrough which terminates at the right in a flared section, the outer end of the flared portion mating with the bore 34 through the barrel. As shown, such flared section snugly receives therewithin the conical forward end of the feed screw 36 when such screw and carriage 50 are at their extreme left-hand positions. The element 76 is heated by means of the band heater 78. A shut-off valve 80 is provided in the bore through the nozzle portion, such valve being operated by the hydraulic cylinder 82 in a conventional manner. When the entire unit 16 has been thrust to the left on the ways 18 on the bed 2 of the machine, the forward end of the nozzle sealingly contacts the outer end of the passage 84 in the mold part 12, as diagrammatically indicated in Fig. 2. When this occurs, the mold parts 12 and 14 will have been forcibly clamped together so that plastic material may be injected by the rotating and reciprocating feed screw 36 upon the opening of valve 80 and upon the thrusting of the feed screw toward the mold.

In Fig. 4 there is shown somewhat diagrammatically the control system for the plasticizing and plastic material delivering unit 16, generally indicating how its operation is correlated with the operation of the other elements of the injection molding apparatus. The oil for operating cylinder 56 is contained in the sump providing tank 88. From such tank the oil is led through pipe 90 into the pump 92 which delivers the oil under high pressure to the shut-off valve 94 and thence to the inlet port 62 of the cylinder. Above valve 94 a branch line 114 is led off pipe 90, such branch line having in series the shut-off valve 98 and the adjustable pressure relief valve 100. Valves 94 and 98 are of conventional structure incorporating therein solenoids, such as solenoid 96 for valve 94, for operating the valves. Valves 94 and 98 are so constructed that when their solenoids are de-energized valve 94 is open and valve 98 is closed. When the solenoids for such valves are energized, by the closing of switch 110 by the depressing of its operating arm by carriage 50, valve 94 is closed and valve 98 is opened. The line 114 from pipe 90, such line incorporating the valves 98 and 100, leads back to the tank 88. A second branch line 116 is led from pipe 90, below valve 94, to the tank 88. An adjustable pressure relief valve 118 in line 116 allows the by-passing of the output from pump 92 into tank 88 when shut-off valve 94 is closed. A manually operated valve 104 is provided in such pipe 102, which is also connected to the port 64 at the left hand of cylinder 56, valve 104 being normally left open during operation of the machine to allow venting of the right-hand end of the chamber to the sump.

A limit switch, generally indicated at 110, is provided on the bed 22 of the unit 16, so as to be adjustable longitudinal of such bed, in such position as to be closed by the carriage 50 when the latter has traveled a predetermined distance to the right. As a result the volume of the plastic material receiving reservoir 39 may be adjusted so as substantially to equal the volume of the mold employed. Such limit switch 110 is inserted in a control circuit 120 shown in Fig. 4, such circuit being fed from the current source $L_1$, $L_2$, the closing of the limit switch operating the solenoid of the valve 112 to admit fluid into the lower, piston rod containing side, of the cylinder 82 so that the valve 80 is thereby opened. The opening of valve 80 allows the plasticized material in the space or reservoir 39 in advance of the feed screw to flow into the mold. Closing of limit switch 110 also energizes solenoid 96 so as to open valve 94 and de-energizes the solenoid for valve 98 so as to close the latter valve. Thereupon oil under pressure enters cylinder 56 through the port 62, the oil being at such pressure as to be sufficient to move the piston 58 forward and thus to thrust feed screw 36 to the left, thereby forcing the plastic material out of the reservoir 39 and injecting it into the mold. The continuous rotation of feed screw 36 maintains continuous feed of the plastic material from the hopper through the barrel and into the reservoir 39, but at a much smaller rate than the feed effected by reciprocation of the feed screw when such screw is acting as an injection plunger.

After the plastic material has been fully injected into the mold, the cut-off valve 80 is closed and the process is repeated, the speed of rotation of screw 36 being regulated by appropriate speed control of motor 66, by means not shown, to maintain synchronism of the various parts of the apparatus during a cycle.

A typical operating cycle for the injection molding of a thermoplastic material by the apparatus of the invention will now be given. The barrel or cylinder 32 is first heated up in preparation for operation, the various zones thereof being under the separate control of their respective adjustable thermostats, as above described. With the feed screw 36 in its position to the extreme left, slow rotation of the screw 36 by the motor 66 is started, and simultaneously the plastic material, usually in granular form, is poured into the hopper 42. The throat section 43 of the hopper is kept cool by running water through the water jacket surrounding it. With the valve 80 opened, the plasticized resin is allowed to emerge from the nozzle. Temperatures, screw speed, and other conditions are adjusted to obtain the proper plasticity and delivery rate of the material to approximate as closely as possible the molding capacity of the injection molding machine. The plasticity can be determined from measuring the temperatures of the plastic material delivered, and the rate of delivery of the plasticized material can be determined by weighing the output of the plasticizing and delivering mechanism at intervals of a minute in computing, for example, performance of the mechanism on an hourly basis.

Valve 80, the cylinder 82 of which is controlled by a suitable solenoid operated valve 112, is now closed, thereby stopping the flow of plasticized material from the nozzle. The granulated plastic compound flows from the hopper 42 through the throat opening 43 and is picked up by the screw 36. The granules are compressed and melted by the action of the screw 36 as they advance to the left. Any air entering the barrel or cylinder 32 is compressed by the action of the screw and is forced back up through the hopper. By the time the thermoplastic material, such as polystyrene, reaches the end of the screw it is thoroughly plasticized, by reason of its continually being worked between the screw and the bore of the barrel and its subjection to heat within the heated barrel. Since such plastic material cannot pass out of the nozzle, valve 80 then being closed, it is deposited ahead of the screw in the space or reservoir 39, thus causing a thrust load upon the screw in a direction to the right. Such thrust load causes the screw 36 to retreat in a direction to the right, thereby leaving an increasingly larger reservoir 39 for the accommodation of the plastic material forwarded by the feed screw. The amount of such accumulation of plasticized material depends upon the mold capacity.

The force at which the screw will retreat is controlled by the hydraulic cylinder 56, to which the screw is connected through the medium of carriage 50. Referring to Fig. 4, at the described portion of the operating cycle valve 94 is closed, valve 98 is open, and pressure relief valve 100 is set so that the feed screw retreats under a given thrust load. During the retreating of the screw the oil from the cylinder 56 runs through pipes 90 and 102 back to the tank 88. During this interval of time, the separable mold parts are placed together, the mold being placed in such position relative to the plastic material injecting mechanism as to be filled thereby. When sufficient material has accumulated in the space or reservoir 39 ahead of the end of the feed screw, the carriage 50 will have retreated far enough to operate the limit switch 110, described above. Thereupon, as before described, the valve 94 is automatically opened, the valve 98 is automatically closed, and the piston 58 is subjected to high pressure, whereby to thrust the carriage 50 and the feed screw 36 toward the position at the extreme left. During such time, of course, the feed screw 36 continues to rotate, so that upon the completion of one cycle and the closing of valve 80 the closing of valve 94 and the opening of valve 98 the above described cycle will be repeated.

It has been found that, because of the extensive plasticizing, mixing, and blending of the plastic material produced by the rotating screw 36, the device can be fed by raw stock, instead of requiring precompounded material. The machine of the invention receives the raw materials, such as plastic material, coloring material, etc. in one cycle and in one operation performing all the operations of mixing, blending, plasticizing, and injection molding or expressing the resultant material. As a result, by use of the mechanism of the invention, the plastic material will have undergone but one heating cycle, that occurring in the machine of the invention, rather than two heating cycles as formerly, in which it was first heated, blended, and extruded, then broken up and, at the molding machine, again heated to plastic condition and injection molded. Thus the plastic material by use of the present machine is subjected to a total heating period which is much shorter than that formerly possible, thereby allowing the machine of the invention to injection mold plastic material which is more heat sensitive than could be handled in prior conventional injection molding machines.

The machine of the invention is extremely efficient in attaining uniformity of heating and of plasticizing of the material, due to the extensive working thereof by the rotating screw. As a result, the material is in optimumly plastic condition when injected into the mold, so that the mold parts may be held together with a much lower pressure than was formerly necessary, and so that the material injecting thrust required upon the screw 36 is smaller than that required on the non-rotating injecting piston of prior art conventional injection molding machines. Furthermore, the mechanism of the invention employs no material diverting structures such as spreaders, torpedoes, and the like, which conventional injection molding machines impose in the path of the flow of material into the mold. This is a further reason why lower injection pressures can be employed with the apparatus of the invention, and it also accounts for the economy of the present machine, since the parts thereof are simple and the strains thereon are low and completely symmetrical about the axis of the barrel and nozzle. Because the screw 36 is constantly rotating in such direction as to feed plasticized material toward the left-hand end of the barrel, the machine presents no problems as to the bleeding of the plastic material past the feed screw when it functions as an expressing plunger. The material which normally would escape backwardly between the lands of the screw and the cylinder barrel is, of course, immediately forwarded again by the action of the rotating feed screw. As was mentioned previously, it is preferred that the feed screw have at least one fully developed helical turn thereof extending rearwardly beyond the throat 43 of the feed hooper when the screw is in its extreme left-hand position. The cooled throat 43 of the feed hopper, taken in conjunction with such extended screw thread, will result in the constant provision of a mass of substantially solid granular plastic material between the right-hand end of the barrel and the feed screw. As a consequence such solid granular plastic material constitutes an effective sealing means against the escape or bleeding back of molten plastic material from the zone in the barrel adjacent the forward, left-hand, end of the feed screw, especially when it is acting as an injection piston in the mold filling portion of the cycle.

Whereas for purposes of illustration I have shown and described a preferred embodiment of the apparatus for plasticizing and delivering plastic material of the invention, particularly when it is employed in an injection molding machine, it is to be understood that such embodiment is illustrative only and that the invention is capable of considerable variation as to details. The invention is, therefore, to be defined by the scope of the claims appended hereto.

I claim as new the following:

1. A plastic material plasticizing and delivering mechanism comprising a barrel having a passage extending longitudinally therein, a rotatable and reciprocable screw for feeding plastic material toward the forward end of the screw, means for feeding plastic material between the screw and the wall of the passage at a point spaced from the forward end of the screw, means selectively opening and closing the forward end of the passage, means for rotating the screw, means for selectively forcibly but yieldingly opposing reciprocation of the screw in the passage in a rearward direction, and means responsive to a predetermined length of travel of the screw in a rearward direction for positively thrusting the screw in the passage in a forward direction to feed the plasticized material out the forward end of the barrel.

2. A plastic material plasticizing and delivering mechanism comprising an elongated barrel having a circular cylindrical passage extending axially therein, a rotatable and reciprocable screw within such passage for feeding plastic material toward the forward end of the screw, the lands of the screw being located in material feeding relationship with the wall of the passage, a feed hopper mounted on the barrel in a position longitudinally thereof so as to lie intermediate the ends of the threaded portion of the screw when the latter is in either its extreme forward or extreme rearward position, said hopper feeding plastic material between the screw and the wall of the passage, means selectively opening and closing the forward end of the passage, means for constantly rotating the screw during operation of the machine, adjustable means for forcibly but yieldingly opposing reciprocation of the screw in the passage in a rearward direction, control means operated upon a predetermined length of travel of the screw in a rearward direction, and means responsive to said control means for positively thrusting the screw in the passage in a forward direction to feed the plasticized material out the forward end of the barrel.

3. A plastic material plasticizing and delivering mechanism comprising an elongated barrel having a circular cylindrical passage extending axially therein, a rotatable and reciprocable screw within such passage for feeding plastic material toward the forward end of the screw, the lands of the screw being located at least substantially on an imaginary circular cylinder and in material feeding relationship with the wall of the passage, a feed hopper mounted on the barrel in a position longitudinally thereof so as to lie intermediate the ends of the threaded portion of the screw when the latter is in either its extreme forward or extreme rearward position, said hopper feeding plastic material between the screw and the wall of the passage, passage closing means selectively opening and closing the forward end of the passage, variable speed means for constantly rotating the screw during operation of the machine, means for forcibly but yieldingly opposing with a selectively variable pressure reciprocation of the screw in the passage in a rearward direction, control means operated upon a predetermined length of travel of the screw in a rearward direction, and means responsive to said control means for positively thrusting the screw in the passage in a forward direction and to open the passage closing means, whereby plastic material is thrust from the forward end of the barrel.

4. In a machine for the injection molding of plastics including a mold, a plastic material plasticizing and delivering mechanism, and means for establishing communication between such mechanism and the mold, the improved plastic material plasticizing and delivering mechanism which comprises a barrel having a passage extending longitudinally therein, a rotatable and reciprocable screw for feeding plastic material toward the forward end of the screw, means for feeding plastic material between the screw and the wall of the passage at a point spaced from the forward end of the screw, means selectively opening and closing the forward end of the passage, means for rotating the screw, means for selectively forcibly but yieldingly opposing reciprocation of the screw in the passage in a rearward direction, and means responsive upon a predetermined length of travel of the screw in a rearward direction for positively thrusting the screw in the passage in a forward direction to feed the plasticized material out the forward end of the barrel.

5. In a machine for the injection molding of plastics including a mold, a plastic material plasticizing and delivering mechanism, and means for establishing communication between such mechanism and the mold, the improved plastic material plasticizing and delivering mechanism which comprises an elongated barrel having a circular cylindrical passage extending axially therein, a rotatable and reciprocable screw within such passage for feeding plastic material toward the forward end of the screw, the lands of the screw being located in material feeding relationship with the wall of the passage, a feed hopper mounted on the barrel in a position longitudinally thereof so as to lie intermediate the ends of the threaded portion of the screw when the latter is in either its extreme forward or extreme rearward position, said hopper feeding plastic material between the screw and the wall of the passage, means selectively opening and closing the forward end of the passage, variable speed means for constantly rotating the screw during operation of the machine, adjustable means for yieldingly opposing reciprocation of the screw in the passage with a predetermined force to allow the screw to retreat in a rearward direction, control means operated upon a predetermined length of travel of the screw in a rearward direction, and means responsive to said control means for positively thrusting the screw in the passage in a forward direction, said control means when operated also functioning to open the forward end of the passage, whereby plastic material is thrust from the forward end of the barrel.

6. A machine for the injection molding of plastics comprising a separable mold, means to open and close such mold, a plastic material plasticizing and delivering mechanism, means mounting such mechanism for selective movement into communication with the mold or away therefrom, the plastic material plasticizing and delivery mechanism comprising a barrel having a circular cylindrical passage extending longitudinally therein, a rotatable and reciprocable screw within the passage for feeding plastic material toward the forward end of the screw, means for feeding plastic material between the ends of the threaded portion of the screw and the wall of the passage at a point spaced from the forward end of the screw, means selectively opening and closing the forward end of the passage to open and close, respectively, the path of communication between the mechanism and the mold, means for rotating the screw, a fluid pressure motor having a cylinder and a piston for selectively forcibly but yieldingly opposing with a relatively variable pressure reciprocation of the screw in the passage to allow the screw to retreat in a rearward direction, and means responsive to a predetermined amount of retreating motion of the feed screw to open the path of communication between the mechanism and the mold and to subject the cylinder to fluid under pressure to thrust the feed screw in a forward, material injecting, direction.

7. A machine for the injection molding of plastics comprising a separable mold, means to open and close such mold, a plastic material plasticizing and delivering mechanism, means mounting such mechanism for selective movement into communication with the mold or away therefrom, the plastic material plasticizing and delivery mechanism comprising an elongated barrel having a circular cylindrical passage extending axially therein, a rotatable and reciprocable screw within such passage for feeding plastic material toward the forward end of the screw, the lands of the screw being located at least substantially on an imaginary circular cylinder and in material feeding relationship with the wall of the passage, a feed hopper mounted on the barrel in a position longitudinally thereof so as to lie intermediate the ends of the threaded portion of the screw when the latter is in either its extreme forward or extreme rearward position, said hopper feeding plastic material between the screw and the wall of the passage, means selectively opening and closing the forward end of the passage to open and close, respectively, the path of communication between the mechanism and the mold, variable speed means for constantly rotating the screw during operation of the machine, adjustable means for forcibly but yieldingly opposing reciprocation of the screw in the passage to allow the screw to retreat in a rearward direction, control means operated upon a predetermined length of travel of the screw in a rearward direction, and means responsive to said control means for positively thrusting the screw in the passage in a forward direction, said control means when operated also functioning to open the forward end of the passage, whereby plastic material is injected from the mechanism into the mold.

8. A machine for the injection molding of plastics comprising a separable mold, means to open and close such mold, a plastic material plasticizing and delivering mechanism, means mounting such mechanism for selective movement into communication with the mold or away therefrom, plastic material plasticizing and delivering mechanism comprising a barrel having a passage extending longitudinally therein, a rotatable and reciprocable screw within such passage for feeding plastic material toward the forward end of the screw, means for feeding plastic material between the screw and the wall of the passage at a point spaced from the forward end of the screw, means for selectively opening and closing the forward end of the passage to open and close, respectively, the path of communication between the mechanism and the mold, means for rotating the screw, a fluid pressure motor having a cylinder and a piston, means connecting the motor to the screw to control the reciprocation of the screw, a source of fluid under pressure, valve means connecting the said source to the motor whereby such motor when under pressure positively thrusts the screw in the passage in a forward direction, an adjustable fluid bleeding system connected to to the motor whereby the motor yieldingly opposes with a selectively variable force the retreat in a rearward direction, and means responsive to a predetermined length of retreating motion of the feed screw to open the path of communication between the mechanism and the mold, to subject the cylinder of the motor to fluid under pressure to thrust the feed screw in the forward, material injecting, direction, and to by-pass the fluid bleeding system.

9. A plastic material plasticizing and delivering mechanism comprising an elongated barrel having a circular cylindrical passage extending axially therein, a rotatable and reciprocable screw within such passage for feeding plastic toward the forward end of the screw, a feed hopper mounted on the barrel in a position longitudinally thereof so as to lie intermediate of the ends of the threaded portion of the screw when the latter is in either its extreme forward or extreme rearward position, said hopper feeding plastic material between the screw and the wall of the passage, passage closing means selectively opening and closing the forward end of the passage, means for constantly rotating the screw during operation of the machine, a fluid pressure motor having a cylinder and a piston, means connecting the motor to the screw to control reciprocation of the screw, a source of fluid under pressure, valve means connecting the said source to the motor whereby such motor when under pressure positively thrusts the screw in a forward direction in the passage, an adjustable fluid bleeding system connected to the motor whereby the motor yieldingly opposes with a selectively variable force the retreating of the screw in a rearward direction, and means responsive to a predetermined length of retreating motion of the feed screw to open the passage closing means to subject the cylinder of the motor to fluid under pressure to thrust the feed screw in the forward, material injecting, direction.

10. A machine for the injection molding of plastics comprising a separable mold, means to open and close such mold, a plastic material plasticizing and delivering mechanism, means mounting such mechanism for selective movement into communication with the mold or away therefrom, plastic material plasticizing and delivering mechanism comprising a barrel having a passage extending longitudinally therein, a rotatable and reciprocable screw within such passage for feeding plastic material toward the forward end of the screw, means for feeding plastic material between the screw and the wall of the passage at a point spaced from the forward end of the screw, means for selectively opening and closing the forward end of the passage to open and close, respectively, the path of communication between the mechanism and the mold, means for rotating the screw, a fluid pressure motor having a cylinder and a piston, means connecting the motor to the screw to control the reciprocation of the screw, a source of fluid under pressure, valve means connecting the said source to the motor whereby such motor when under pressure positively thrusts the screw in the passage in a forward direction, an adjustable fluid bleeding system connected to the motor whereby the motor yieldingly opposes with a selectively variable force the retreat in a rearward direction, and means responsive to a predetermined length of retreating motion of the feed screw to open the path of communicating between the mechanism and the mold, to subject the cylinder of the motor to fluid under pressure to thrust the feed screw in the forward, material injecting, direction.

References Cited in the file of this patent

UNITED STATES PATENTS

| | | |
|---|---|---|
| 2,359,839 | Goessling | Oct. 10, 1944 |
| 2,402,805 | Cousino | June 25, 1946 |
| 2,471,813 | Cousino | May 31, 1949 |
| 2,493,805 | Dinzl | Jan. 10, 1950 |
| 2,629,132 | Willcox | Feb. 24, 1953 |

FOREIGN PATENTS

| | | |
|---|---|---|
| 420,839 | Italy | Mar. 9, 1947 |